United States Patent
Kim et al.

(10) Patent No.: US 10,342,061 B2
(45) Date of Patent: Jul. 2, 2019

(54) RADIO COMMUNICATION SYSTEM AND CONTROL METHOD

(71) Applicant: NTT DOCOMO, INC., Tokyo (JP)

(72) Inventors: Jinho Kim, Tokyo (JP); Hiroto Yasuda, Tokyo (JP); Yasufumi Morioka, Tokyo (JP); Hideaki Takahashi, Tokyo (JP); Junichiro Hagiwara, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/915,986

(22) Filed: Mar. 8, 2018

(65) Prior Publication Data

US 2018/0199393 A1    Jul. 12, 2018

Related U.S. Application Data

(62) Division of application No. 14/439,984, filed as application No. PCT/JP2013/077081 on Oct. 4, 2013, now Pat. No. 9,955,513.

(30) Foreign Application Priority Data

Nov. 1, 2012   (JP) ................ 2012-241713

(51) Int. Cl.
*H04W 76/15*   (2018.01)
*H04W 74/00*   (2009.01)
(Continued)

(52) U.S. Cl.
CPC ......... *H04W 76/15* (2018.02); *H04W 74/002* (2013.01); *H04W 76/10* (2018.02); *H04W 76/12* (2018.02); *H04W 88/16* (2013.01)

(58) Field of Classification Search
CPC ..... H04W 76/15; H04W 76/12; H04W 76/10; H04W 74/002; H04W 88/16
See application file for complete search history.

(56) References Cited

U.S. PATENT DOCUMENTS

2010/0278108 A1    11/2010   Cho et al.
2011/0075675 A1*   3/2011   Koodli ................... H04L 12/14
                                                                370/401
(Continued)

FOREIGN PATENT DOCUMENTS

WO        2011137775 A1    11/2011

OTHER PUBLICATIONS

International Search Report issued in PCT/JP2013/077081 dated Nov. 12, 2013 (3 pages).
(Continued)

*Primary Examiner* — Jae Y Lee
(74) *Attorney, Agent, or Firm* — Osha Liang LLP

(57) ABSTRACT

A radio communication system is disclosed that includes at least one user equipment and multiple base stations including a first base station configured to execute radio resource control of the user equipment through a control path and a second base station configured not to execute radio resource control of the user equipment. The system includes multiple gateways, including a first gateway connected with the first base station and a second gateway connected with the second base station, and a switching station that controls the establishment of user paths among nodes.

3 Claims, 10 Drawing Sheets

(51) Int. Cl.
*H04W 76/12* (2018.01)
*H04W 76/10* (2018.01)
*H04W 88/16* (2009.01)

(56) References Cited

U.S. PATENT DOCUMENTS

2013/0165130 A1  6/2013  Wu et al.
2015/0282238 A1  10/2015  Aminaka et al.

OTHER PUBLICATIONS

3GPP TS 23.401 V12.0.0; "3rd Generation Partnership Project; Technical Specification Group Services and System Aspects; General Packet Radio Service (GPRS) enhancements for Evolved Universal Terrestrial Radio Access Network (E-UTRAN) access (Release 12)"; Mar. 2013 (289 pages).

3GPP TS 36.300 V10.6.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)" Dec. 2011 (194 pages).

Extended European Search Report in counterpart European Patent Application No. 13852050.7, dated Oct. 29, 2015 (12 pages).

NTT Docomo, Inc.; "Requirements, Candidate Solutions & Technology Roadmap for LTE Rel-12 Onward"; 3GPP workshop on Release 12 and onwards, RWS-120010; Ljubljana, Slovenia, Jun. 11-12, 2012 (20 pages).

Kishiyama, Yoshihisa; NTT Docomo, Inc.; "Conceptual Views and Candidate Technologies for Future Radio Access"; TTA workshop: LTE-Advanced and Beyond, Sep. 7, 2012 (20 pages).

Office Action issued in corresponding European Application No. 13852050.7, dated Feb. 20, 2017 (11 pages).

\* cited by examiner

RADIO COMMUNICATION SYSTEM AND CONTROL METHOD

CROSS REFERENCE TO RELATED APPLICATIONS

Pursuant to 35 U.S.C. § 121, the present application is a divisional application of U.S. patent application Ser. No. 14/439,984, filed on Apr. 30, 2015, which is a U.S. national stage entry under 35 U.S.C. § 371 of International Application No. PCT/JP2013/077081 filed Oct. 4, 2013, which claims priority to JP 2012-241713 filed on Nov. 1, 2012. The contents of these applications are hereby incorporated by reference in their entirety.

FIELD OF THE INVENTION

The present invention relates to a radio communication system and to a control method.

BACKGROUND

Various radio communication systems complying with the 3GPP (Third Generation Partnership Project) standards have been utilized. In radio communication systems complying with the LTE/SAE (Long Term Evolution/System Architecture Evolution) standards among the 3GPP standards, user equipments execute communication with external networks (such as the Internet) via eNBs (evolved Node Bs), which are base stations, and gateways (SAE Gateways).

The communication is executed via logical paths established between nodes within the radio communication system. More specifically, a user equipment exchanges user data (such as voice data, picture data, etc.) with an external network via a data radio bearer, which is a logical path established between the user equipment and a base station (eNB), and an S1-U bearer, which is a logical path established between the base station (eNB) and a gateway. Logical paths used for user data communication are referred to as user plane paths (U-plane paths). Control of user plane paths (establishment, change, release, etc.) is conducted by the initiative of an MME (Mobility Management Entity), which is a switching station. For example, an S1-U bearer is established by that the switching station controls (exchanges control signals with) the base station (eNB) and the gateway that will be endpoints of the S1-U bearer. Exchange of control signals are executed via a control plane path (C-plane path), which is a logical path for control established between nodes.

RELATED ART DOCUMENTS

Non-Patent Documents

Non-patent Document 1: 3GPP TS 36.300 V10.6.0 (2011-12), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

SUMMARY OF THE INVENTION

Let us assume that a radio communication system includes, in addition to the above-mentioned base station (eNB) and gateway, a new type of base station that does not have C-plane paths to user equipments and a new type of gateway corresponding to the new type of base station. As will be appreciated, of course, the conventional 3GPP standards have no provisions regarding the new type of base station and the new type of gateway, and have no provisions regarding logical paths (U-plane paths and C-plane paths) established between the new type of base station and the new type of gateway. Accordingly, in radio communication systems complying with the conventional 3GPP standards, it is difficult to provide a system including such a new type of base station and a new type of gateway.

Accordingly, it is an object of the present invention to provide a radio communication system including a new type of base station and a new type of gateway.

A radio communication system according to a first aspect of the present invention includes: at least one user equipment; multiple base stations including a first base station configured to execute radio resource control of the user equipment through a control path, and a second base station configured not to execute radio resource control of the user equipment; multiple gateways including a first gateway connected with the first base station, and a second gateway connected with the second base station; and a switching station configured to control establishment of user paths among nodes. The switching station includes: a switching-station-decision-unit configured to decide whether or not a gateway through which communication executed by the user equipment should be routed is the second gateway; and a switching station controller configured to control the second base station and the second gateway so as to establish a first user path for uplink from the second base station to the second gateway and to control the first base station and the second base station so as to establish a second user path that is a radio path between the user equipment and the second base station in a case in which the switching-station-decision-unit decides that the gateway through which communication executed by the user equipment should be routed is the second gateway. The first base station includes: a first base station controller configured to control the user equipment so as to establish the second user path on the basis of control by the switching station controller. The second base station includes: a second base station controller configured to control the second base station and the second gateway to establish a first user path for downlink from the second gateway to the second base station.

In a preferred embodiment of the present invention, the switching station controller is configured to transmit a session establishment request message to the second gateway in a case in which the switching-station-decision-unit decides that the gateway through which communication executed by the user equipment should be routed is the second gateway, the session establishment request message requesting establishment of a logical session involving the first user path and the second user path. The second gateway includes a second gateway controller configured to generate an uplink path identifier for identifying the first user path for uplink upon receiving the session establishment request message from the switching station, and to transmit a session establishment response message including the uplink path identifier to the switching station. The switching station controller is configured to generate a radio path identifier for identifying the second user path upon receiving the session establishment response message from the second gateway, and to transmit a first user path establishment request message to the second base station, the first user path establishment request message including the radio path identifier and the uplink path identifier included in the session establishment response message, the first user path establishment request message requesting establishment of the first user path. The second base station controller is configured to store the radio path identifier included in the first user path establishment request message upon receiving the first user path establishment request message, to generate a downlink path identifier for identifying the first user path for downlink, to establish the first user path for uplink with the use of the uplink path identifier included in the first user path establishment request message, and to transmit a first user path establishment completion message including the radio path identifier to the switching station.

In a preferred embodiment of the present invention, the switching station controller is configured to transmit a second user path establishment request message to the first base station upon receiving the first user path establishment completion message from the second base station, the second user path establishment request message including the radio path identifier and requesting establishment of the second user path. The first base station controller is configured to transmit a radio setting message to the user equipment upon receiving the second user path establishment request message from the switching station, the radio setting message including the radio path identifier and requesting the user equipment and the second base station to establish the second user path. The user equipment includes a user equipment controller configured to establish the second user path with the use of the radio path identifier included in the radio setting message upon receiving the radio setting message from the first base station.

In a preferred embodiment of the present invention, the second base station controller is configured to, upon receiving the first user path establishment request message or upon establishment of the second user path, associate the first user path with the second user path by associating the uplink path identifier with the radio path identifier and by associating the downlink path identifier with the radio path identifier, and to transmit a local connection request message to the second gateway, the local connection request message including the downlink path identifier and requesting establishment of the first user path for downlink. The second gateway controller is configured to establish the first user path for downlink with the use of the downlink path identifier upon receiving the local connection request message from the second base station, and to transmit a local connection response message indicating that the first user path for downlink has been established to the second base station.

In a preferred embodiment of the present invention, in a case in which a third user path that is a radio path has been established between the user equipment and the first base station, the third user path is released after the first user path is established by establishing the first user path for uplink and the first user path for downlink.

A radio communication system according to a second aspect of the present invention includes: at least one user equipment; multiple base stations including a first base station configured to execute radio resource control of the user equipment through a control path, and a second base station configured not to execute radio resource control of the user equipment; multiple gateways including a first gateway connected with the first base station, and a second gateway connected with the second base station; and a switching station configured to control establishment of user paths among nodes. The switching station includes: a switching-station-decision-unit configured to decide whether or not a gateway through which communication executed by the user equipment should be routed is the first gateway; and a switching station controller configured to, in a case in which the user equipment has executed communication via a logical session involving a first user path established between the second gateway and the second base station and a second user path established between the second base station and the user equipment, and in a case in which the switching-station-decision-unit decides that the gateway through which communication executed by the user equipment should be routed is the second gateway, control the first base station so as to release the second user path and so as to establish a third user path between the user equipment and the first base station. The first base station includes: a first base station controller configured to control the user equipment so as to establish the third user path on the basis of control by the switching station controller. The switching station controller is configured to control the second gateway and the second base station so as to release the first user path after establishment of the third user path.

In a preferred embodiment of the present invention, the switching station controller is configured to transmit a second user path modification request message to the first base station in a case in which the switching-station-decision-unit decides that the gateway through which communication executed by the user equipment should be routed is the second gateway, the second user path modification request message requesting release of the second user path. The first base station controller is configured to transmit a radio setting message to the user equipment upon receiving the second user path modification request message, the radio setting message requesting release of the second user path. The user equipment includes a user equipment controller configured to, upon receiving the radio setting message, release the second user path and to transmit a radio setting completion message to the first base station, the radio setting completion message indicating that the second user path has been released and requesting establishment of the third user path. The first base station controller is configured to establish the third user path between the first base station and the user equipment, and to transmit to the switching station a second user path modification response message indicating that the third user path has been established.

In a preferred embodiment of the present invention, the switching station controller is configured to transmit to the second gateway a session deletion request message requesting release of the logical session involving the first user path upon receiving the second user path modification response message. The second gateway includes a second gateway controller configured to transmit to the second base station a first user path release request message requesting release of the first user path upon receiving the session deletion request message. The second base station includes a second base station controller configured to, upon receiving the first user path release request message, dissolve association between the first user path and the second user path, and to transmit a first user path release response message to the second gateway. The second gateway controller is configured to release the first user path upon receiving the first user path release response message.

A control method according to the first aspect of the present invention is a control method in a radio communication system including: at least one user equipment; multiple base stations including a first base station configured to execute radio resource control of the user equipment through a control path, and a second base station configured not to execute radio resource control of the user equipment; multiple gateways including a first gateway connected with the first base station, and a second gateway connected with the second base station; and a switching station configured to control establishment of user paths among nodes. The method includes: at the switching station, deciding whether or not a gateway through which communication executed by the user equipment should be routed is the second gateway; controlling the second base station and the second gateway so as to establish a first user path for uplink from the second base station to the second gateway in a case in which it is decided that the gateway through which communication executed by the user equipment should be routed is the second gateway; and controlling the first base station and the second base station so as to establish a second user path that is a radio path between the user equipment and the second base station. The method also includes: at the first base station, controlling the user equipment so as to establish the second user path on the basis of control by the switching station, and at the second base station, controlling the second base station and the second gateway to establish a first user path for downlink from the second gateway to the second base station.

A control method according to the second aspect of the present invention is a control method in a radio communication system including: at least one user equipment; multiple base stations including a first base station configured to execute radio resource control of the user equipment through a control path, and a second base station configured not to execute radio resource control of the user equipment; multiple gateways including a first gateway connected with the first base station, and a second gateway connected with the second base station; and a switching station configured to control establishment of user paths among nodes. The method includes: at the switching station, deciding whether or not a gateway through which communication executed by the user equipment should be routed is the second gateway; controlling the first base station so as to release a second user path and so as to establish a third user path between the user equipment and the first base station in a case in which the user equipment has executed communication via a logical session involving a first user path established between the second gateway and the second base station and the second user path established between the second base station and the user equipment, and in a case in which it is decided that the gateway through which communication executed by the user equipment should be routed is the second gateway. The method also includes: at the first base station, controlling the user equipment so as to establish the third user path on the basis of control by the switching station, and at the switching station, controlling the second gateway and the second base station so as to release the first user path after establishment of the third user path.

According to the present invention, it is possible to provide a radio communication system including a new type of second base station, which is different from the first base station, and a second gateway corresponding to the second base station. In particular, according to the first aspect of the present invention, in a case in which it is decided that the user equipment should execute communication through the second gateway, the first user path and the second user path that are necessary for the communication are established, so that the communication through the second gateway can be executed. According to the second aspect of the present invention, in a case in which it is decided that the user equipment should execute communication through the first gateway, the third user path that is necessary for the communication is established, so that the communication through the first gateway SAEGW can be executed.

DETAILED DESCRIPTION

1. First Embodiment

1(1). Structure of Radio Communication System

Figure 1:
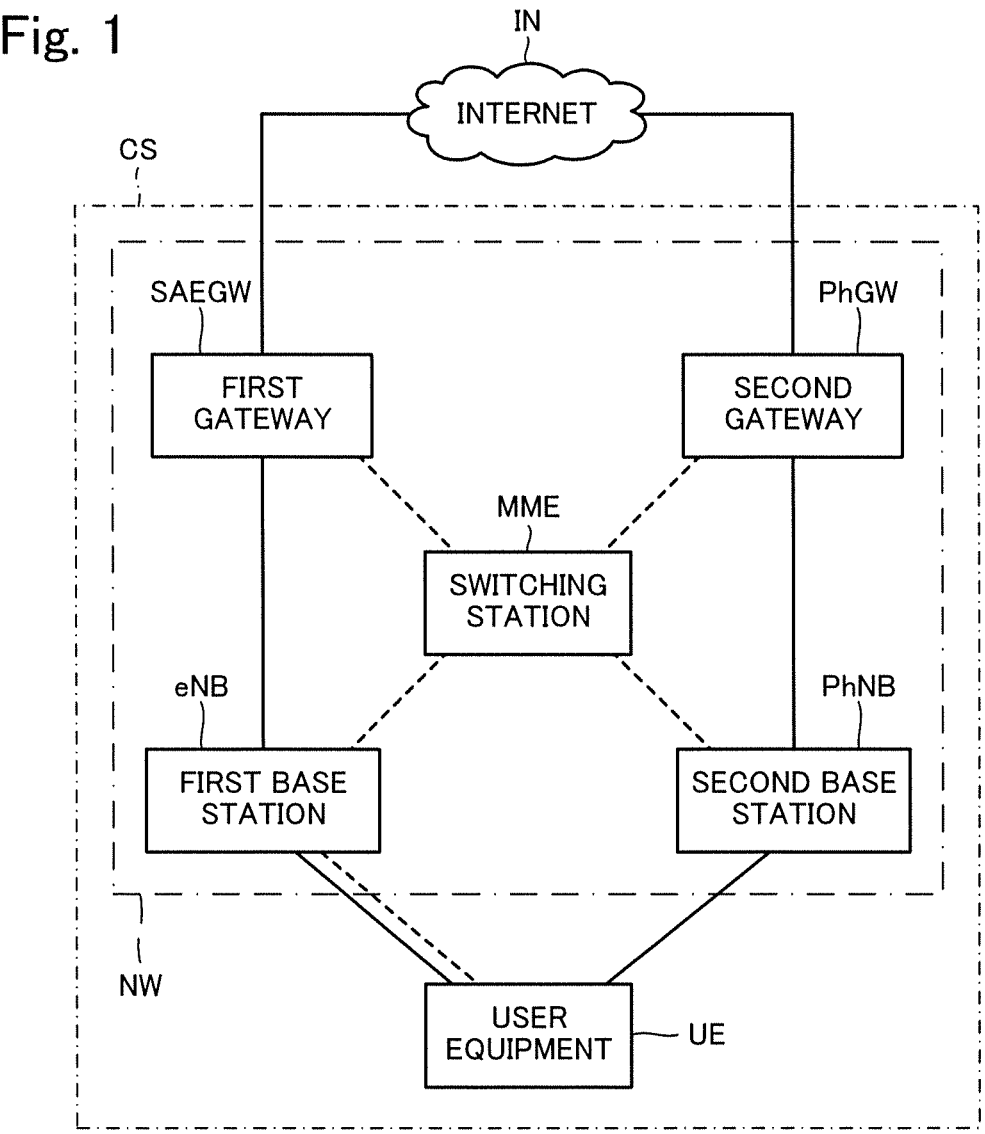
FIG. 1 is a block diagram showing a radio communication system according to a first embodiment of the present invention.

FIG. 1 is a block diagram showing the structure of a radio communication system CS according to the first embodiment of the present invention. The radio communication system CS includes at least one user equipment UE, a first base station eNB, a second base station PhNB, a first gateway SAEGW, a second gateway PhGW, and a switching station MME. A network NW includes all elements of the radio communication system CS, except for the user equipment UE.

Each element in the radio communication system CS performs communication in compliance with a predetermined access technology, for example, the LTE/SAE (Long Term Evolution/System Architecture Evolution) standards included in the 3GPP (Third Generation Partnership Project) standards. According to terms defined in the 3GPP standards, the user equipment UE is a user equipment, the first base station eNB is an evolved Node B, the switching station MME is a mobile management entity, and the first gateway SAEGW is an SAE Gateway (System-Architecture-Evolution Gateway). In connection with the present embodiment, an aspect in which the radio communication system CS operates in principle in compliance with LTE/SAE is exemplified, but this is not intended to limit the technical scope of the present invention. The present invention can be used with other radio access technologies with necessary design modifications.

The second base station PhNB is a new type of base station that is different from the first base station eNB. The second gateway PhGW is also a new type of gateway that is different from the first gateway SAEGW. The details of the second base station PhNB and the second gateway PhGW will be described later.

The user equipment UE can execute wireless communication with the first base station eNB and the second base station PhNB. The scheme for radio communication between the user equipment UE and each base station (eNB and PhNB) may be freely chosen. For example, OFDMA (Orthogonal Frequency Division Multiple Access) may be adopted for downlink, whereas SC-FDMA (Single-Carrier Frequency Division Multiple Access) may be adopted for uplink. In addition, the scheme of radio communication used by the first base station eNB may be different from the scheme of radio communication used by the second base station PhNB.

The first base station eNB is connected with the switching station MME and the first gateway SAEGW. The second base station PhNB is connected with the switching station MME and the second gateway PhGW. The switching station MME is connected with the first gateway SAEGW and the second gateway PhGW in addition to the first base station eNB and the second base station PhNB. The first gateway SAEGW is connected with the first base station eNB and the switching station MME, and also connected with the Internet IN, which is an external network of the radio communication system CS. The second gateway PhGW is connected with the second base station PhNB and the switching station MME, and also connected with the Internet IN. In other words, each of the first gateway SAEGW and the second gateway PhGW serves as a connection point (access point) with an external network. The above-mentioned connections are typically wired connections, but some or all of the above-mentioned connections may be wireless connections.

1(2). Interfaces and Logical Paths

In FIG. 1, the solid lines show paths used for transmission and reception of user signals (signals indicating user data, such as voice data, picture data, etc.), whereas dashed lines show paths used for transmission and reception of control signals. In other words, the solid lines show interfaces of the U-plane (user plane), whereas the dashed lines show interfaces of the C-plane (control plane). A U-plane path is established via a U-plane interface, whereas a C-plane path is established via a C-plane interface. However, as shown in FIG. 1, a C-plane interface does not exist between the user equipment UE and the second base station PhNB.

In the radio communication system CS, signals are exchanged through bearers that are logical paths. Bearers are dynamic logical paths that are established and released as needed. For example, regarding the U-plane, a data radio bearer DRB1 is established between the user equipment UE and the first base station eNB. An S1-U bearer S1B is established between the first base station eNB and the first gateway SAEGW. Other bearers established via the second base station PhNB and the second gateway PhGW will be described later.

Each node within the radio communication system CS has unique identification information. Such identification information may include the IP address, the TEID (tunnel endpoint identifier), network address, etc. of the node. In addition, identification information of the first base station eNB and the second base station PhNB can include the physical cell ID that identifies the cell C formed by the corresponding base station. The IP address is an address value for uniquely identifying the node in the radio communication system CS. The TEID is an identifier for identifying the endpoint of the bearer (GTP tunnel) logically connecting nodes. The network address is an address value for identifying a subnet to which the node belongs in a case in which the radio communication system CS is divided into multiple subnets. Each node within the radio communication system CS distinguishes another node on the basis of identification information of the other node, and can transmit and receive signals to and from the distinguished node.

1(3). Establishment of U-plane Paths Via Second Base Station and Second Gateway

Figure 2:
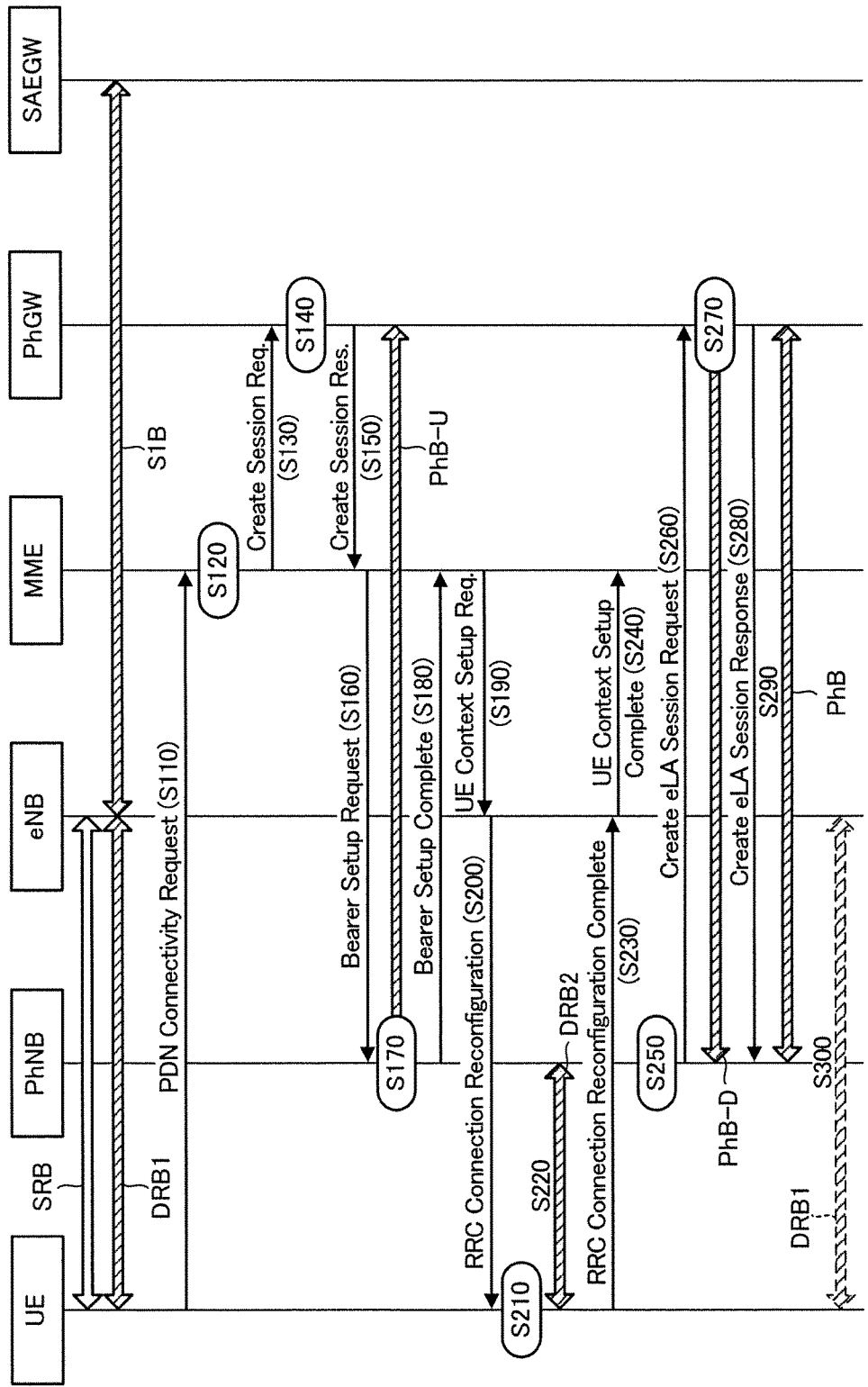
FIG. 2 is a flow diagram showing an example of an establishment operation of U-plane paths according to the first embodiment.

With reference to FIG. 2, an example of an establishment operation of U-plane paths via the second base station PhNB and the second gateway PhGW will be described. In general, the user equipment UE has been executing communication with the Internet IN via the first base station eNB and the first gateway SAEGW. Thereafter, U-plane paths are established via the second base station PhNB and the second gateway PhGW. Upon completion of the operation, the user equipment UE becomes capable of communicating with the Internet IN via the second base station PhNB and the second gateway PhGW with the use of the established U-plane paths.

Figure 3:
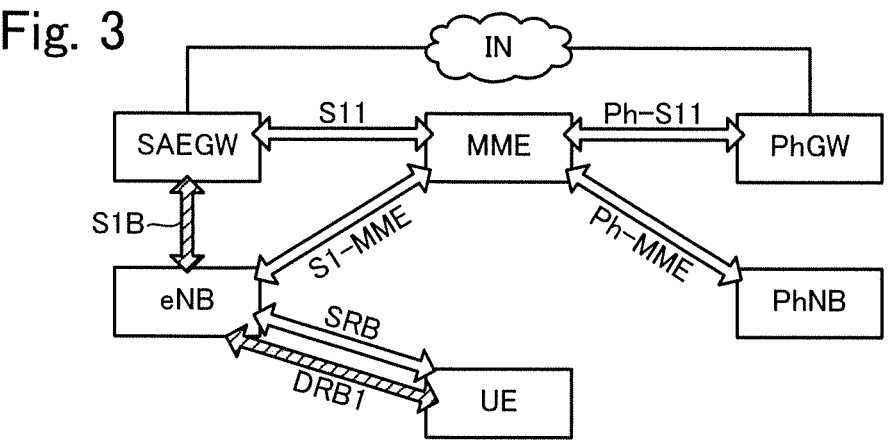
FIG. 3 is a diagram showing a state of logical paths within the radio communication system.

FIG. 3 is a diagram showing the state of logical paths at the start of operation in FIG. 2. As U-plane paths, a first data radio bearer DRB1 is established between the user equipment UE and the first base station eNB, and an S1-U bearer S1B is established between the first base station eNB and the first gateway SAEGW. On the other hand, as C-plane paths, a signaling radio bearer SRB is established between the user equipment UE and the first base station eNB, a control bearer S1-MME is established between the first base station eNB and the switching station MME, a control bearer Ph-MME is established between the second base station PhNB and the switching station, a control bearer S11 is established between the first gateway SAEGW and the switching station MME, and a control bearer Ph-S11 is established between the second gateway PhGW and the switching station MME. Control messages related to establishment of logical paths are exchanged via the above-mentioned C-plane paths.

1(3)-1. Establishment of Uplink Ph Bearer

The user equipment UE sends a PDN connection request message (PDN Connectivity Request message) via the first base station eNB to the switching station MME (S110), the PDN connection request message requesting execution of communication through the second gateway PhGW. The PDN connection request message includes the access point name (APN) of the gateway that is the connection point to the external network. Consequently, the PDN connection request message of this example includes the access point name identifying the second gateway PhGW.

Upon receiving the PDN connection request message from the user equipment UE, on the basis of the access point name included in the PDN connection request message, the switching station MME decides that the gateway through which communication executed by the user equipment UE should be routed is the second gateway PhGW, and generates an identifier (EPS bearer ID) of a logical session (EPS bearer) that should be assigned to the user equipment UE and the second gateway PhGW (S120). As will be described later, this logical session involves a second data radio bearer DRB2 that will be established between the user equipment UE and the second base station PhNB, and a Ph bearer PhB that will be established between the second base station PhNB and the second gateway PhGW. After step S120, the switching station MME sends to the second gateway PhGW a session establishment request message (Create Session Request message) that requests establishment of a logical session for the user equipment UE (S130).

Upon receiving the session establishment request message from the switching station MME, the second gateway PhGW allocates an IP address to the user equipment UE, and generates the TEID of an uplink Ph bearer PhB-U (S140). The uplink Ph bearer PhB-U corresponds to the uplink path (path from the second base station PhNB to the second gateway PhGW) among the Ph bearers PhB that should be established between the second base station PhNB and the second gateway PhGW. Then, the second gateway PhGW sends a session establishment response message (Create Session Response message) including the IP address of the user equipment UE, the EPS bearer ID, and the TEID of the uplink Ph bearer PhB-U to the switching station MME (S150). The identification information included in the session establishment response message is used for establishment of U-plane paths.

Upon receiving the session establishment response message from the second gateway PhGW, the switching station MME generates a data radio bearer identifier DRBID that identifies the second data radio bearer DRB2, and sends to the second base station PhNB a bearer establishment request message (Bearer Setup Request message) for requesting establishment of the Ph bearer PhB (S160). The bearer establishment request message includes the data radio bearer identifier DRBID generated by the switching station MME, the TEID of the uplink Ph bearer PhB-U included in the session establishment response message, and the IP address of the second gateway PhGW.

Upon receiving the bearer establishment request message from the switching station MME, the second base station PhNB (a) stores the data radio bearer identifier DRBID included in the message, (b) generates the TEID of a downlink Ph bearer PhB-D, (c) and establishes the uplink Ph bearer PhB-U with the use of the TEID of the uplink Ph bearer PhB-U included in the message (S170).

Figure 4:
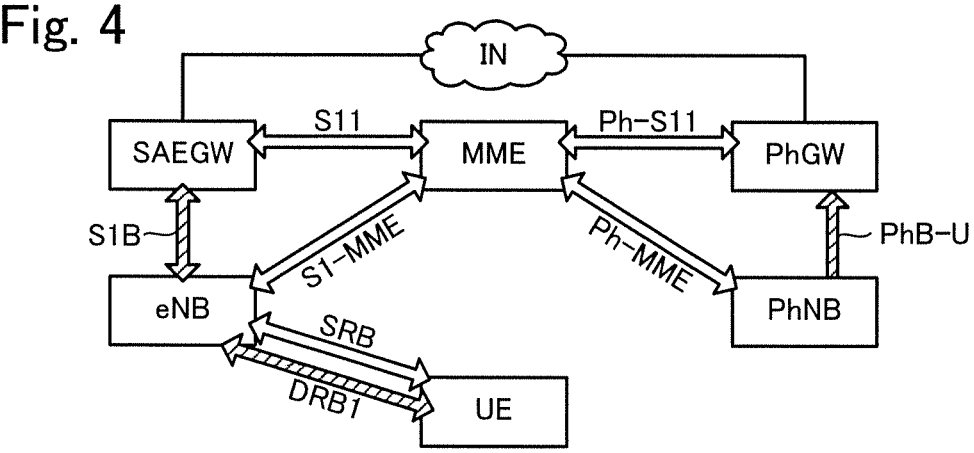
FIG. 4 is a diagram showing a state of logical paths within the radio communication system.

FIG. 4 shows the state of logical paths after establishment of the uplink Ph bearer PhB-U. In the state shown in FIG. 4, the second base station PhNB can send uplink data signals (uplink packets) to the second gateway PhGW via the uplink Ph bearer PhB-U. However, in the state shown in FIG. 4, a U-plane path is not established between the second base station PhNB and the user equipment UE, so that the user equipment UE cannot execute communication via the second base station PhNB and the second gateway PhGW.

1(3)-2. Establishment of Second Data Radio Bearer

Upon completion of step S170, the second base station PhNB sends a bearer establishment completion message (Bearer Setup Complete message) to the switching station MME (S180). The bearer establishment completion message includes the data radio bearer identifier DRBID and an access stratum setting message (AS-Configuration message) indicating radio settings of the second base station PhNB. The access stratum setting message includes timing information about the random access channel (RACH) that is necessary for the user equipment UE and the second base station PhNB to synchronize with each other, and other information.

Upon receiving the bearer establishment completion message from the second base station PhNB, the switching station MME sends a UE context setting request message (UE Context Setup Request message) and a PDN connection response message (PDN Connectivity Accept message) to the first base station eNB (S190), the UE context setting request message requesting establishment of a second data radio bearer DRB2. The UE context setting request message and the PDN connection response message may be transmitted as independent messages, or such that either is embedded in the other. The UE context setting request message includes the data radio bearer identifier DRBID, the access stratum setting message, and the TEID of the uplink Ph bearer PhB-U. The PDN connection response message includes the IP address of the user equipment UE, the EPS bearer ID, and the access point name of the second gateway PhGW.

Upon receiving the UE context setting request message from the switching station MME, the first base station eNB sends to the user equipment UE a radio setting message (RRC Connection Reconfiguration message) requesting establishment of the second data radio bearer DRB2 to the second base station PhNB (S200). The radio setting message includes the data radio bearer identifier DRBID, the EPS bearer ID, the IP address of the user equipment UE, and the access stratum setting message.

Figure 5:
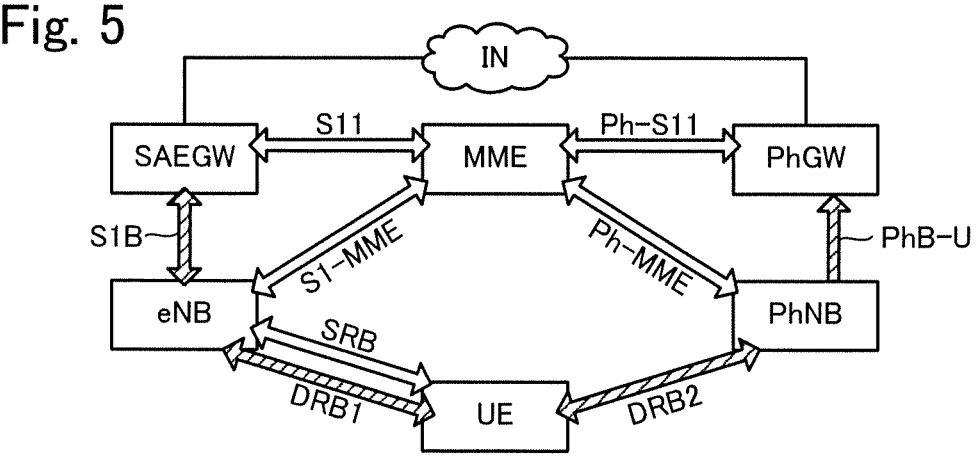
FIG. 5 is a diagram showing a state of logical paths within the radio communication system.

Upon receiving the radio setting message from the first base station eNB, the user equipment UE establishes the second data radio bearer DRB2 to the second base station PhNB with the use of the data radio bearer identifier DRBID included in the radio setting message (S210 and S220). More specifically, on the basis of information indicated by the access stratum message (such as the timing information), the user equipment UE executes synchronization with the second base station PhNB identified by the data radio bearer identifier DRBID, and accesses the second base station PhNB via the random access channel (S210). When the access to the second base station PhNB is successful, the second data radio bearer DRB2 is established (S220). The state of logical paths after establishment of the second data radio bearer DRB2 is shown in FIG. 5.

Upon establishment of the second data radio bearer DRB2, the user equipment UE sends a radio setting completion message (RRC Connection Reconfiguration Complete message) to the first base station eNB (S230). Upon receiving the radio setting completion message, the first base station eNB sends a UE context setting completion message (UE Context Setup Complete message) and a PDN connection completion message (PDN Connectivity Complete message) to the switching station MME (S240).

1(3)-3. Establishment of Downlink Ph Bearer

Upon establishment of the second data radio bearer DRB2, the second base station PhNB associates each of the TEID of the uplink Ph bearer PhB-U and the TEID of the downlink Ph bearer PhB-D with the data radio bearer identifier DRBID (S250). By this association, the Ph bearer PhB is associated with the second data radio bearer DRB2. As will be understood from the above, the association of bearers is executed by association of identifiers (TEID and DRBID). Accordingly, even if a bearer has not been established, if the identifier of the bearer that should be established is already generated, the bearer that should be established can be associated with another bearer. At the time point in step S250, although the downlink Ph bearer PhB-D has not yet been established, the TEID of the downlink Ph bearer PhB-D has already been generated by the second base station PhNB. Therefore, it can be understood that the second base station PhNB can associate the downlink Ph bearer PhB-D with the second data radio bearer DRB2.

Figure 6:
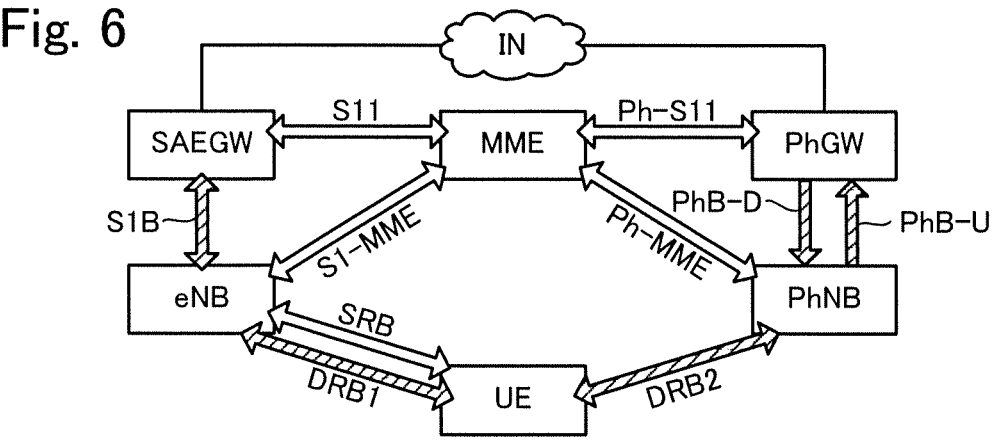
FIG. 6 is a diagram showing a state of logical paths within the radio communication system.

After completion of step S250, the second base station PhNB sends to the second gateway PhGW a local connection request message (Create eLA (enhanced Local Access) Session Request message) requesting establishment of the downlink Ph bearer PhB-D (S260). The local connection request message includes the TEID of the downlink Ph bearer PhB-D. Upon receiving the local connection request message from the second base station PhNB, the second gateway PhGW establishes the downlink Ph bearer PhB-D with the use of the TEID of the downlink Ph bearer PhB-D included in the message (S270). The state of logical paths after establishment of the downlink Ph bearer PhB-D is shown in FIG. 6.

Figure 7:
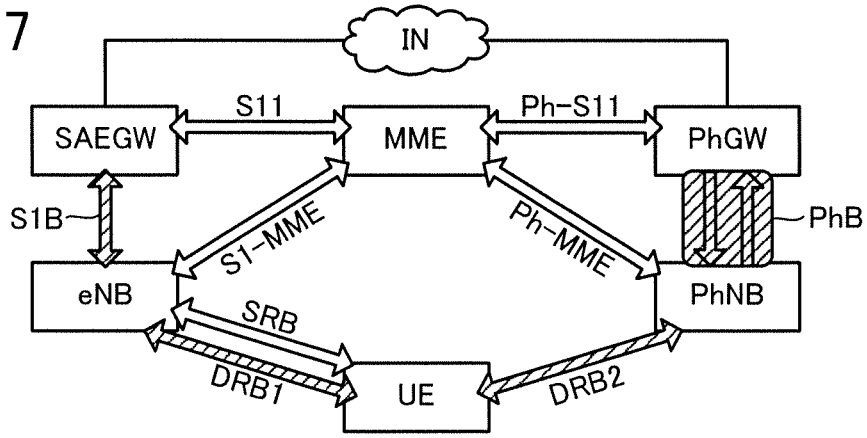
FIG. 7 is a diagram showing a state of logical paths within the radio communication system.

After completion of step S270, the second gateway PhGW sends to second base station PhNB a local connection response message (Create eLA session Response message) indicating that the downlink Ph bearer PhB-D has been established (S280). When the transmitted local connection response message is successfully received by the second base station PhNB, the Ph bearer PhB is established (S290). The state of logical paths after establishment of the Ph bearer PhB is shown in FIG. 7. In the state shown FIG. 7, the user equipment UE can exchange data signals with the Internet IN through the second data radio bearer DRB2 and the Ph bearer PhB (i.e., via the second base station PhNB and the second gateway PhGW).

1(3)-4. Release of First Data Radio Bearer

Figure 8:
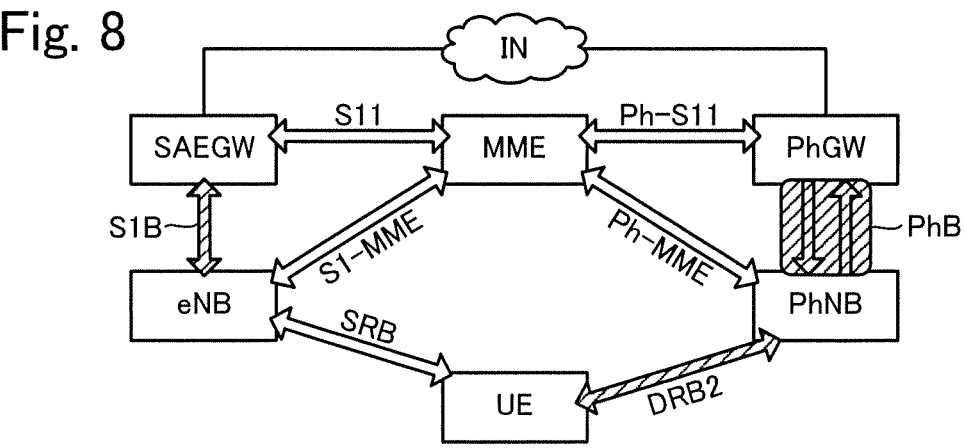
FIG. 8 is a diagram showing a state of logical paths within the radio communication system.
Figure 21:
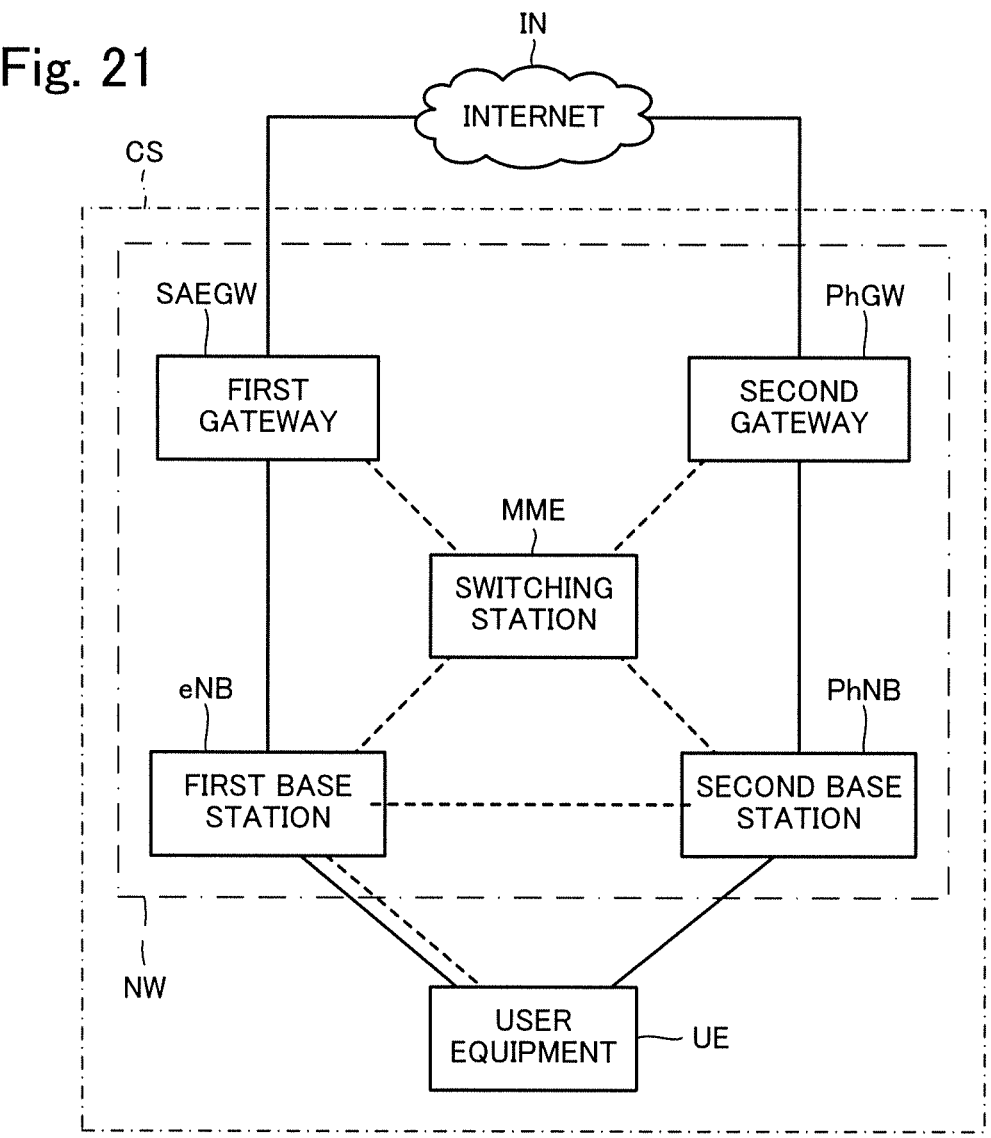
FIG. 21 is a block diagram showing radio communication system according to another example of the present invention.

After completion of establishment of the Ph bearer PhB, the first data radio bearer DRB1 established between the user equipment UE and the first base station eNB is released (S300). The state of logical paths after release of the first data radio bearer DRB1 is shown in FIG. 8. The release operation of the first data radio bearer DRB1 may be conducted by any procedure. For example, the second base station PhNB may send to the switching station MME a message indicating that the Ph bearer PhB has been established, and the switching station MME may control the first base station eNB and the user equipment UE to release the first data radio bearer DRB1. Alternatively, as shown in FIG. 21, if the first base station eNB and the second base station PhNB is interconnected, the second base station PhNB may directly send to the first base station eNB a message indicating that the Ph bearer PhB has been established, and the first base station eNB may control the first base station eNB itself and the user equipment UE to release the first data radio bearer DRB1. Further alternatively, the first data radio bearer DRB1 does not need to be released, and the path to the Internet IN via the first base station eNB and the path to the Internet IN via the second base station PhNB may concurrently exist.

Although the first data radio bearer DRB1 is released at step S300, the signaling radio bearer SRB established between the user equipment UE and the first base station eNB is not released. As mentioned above, a C-plane path (signaling radio bearer SRB) is not established between the user equipment UE and the second base station PhNB. Accordingly, it is preferable that a path be ensured for the user equipment UE and the side of the network NW to exchange control signals, so that the signaling radio bearer SRB remains established.

1(4). Structure of Each Element

1(4)-1. Structure of User Equipment

Figure 9:
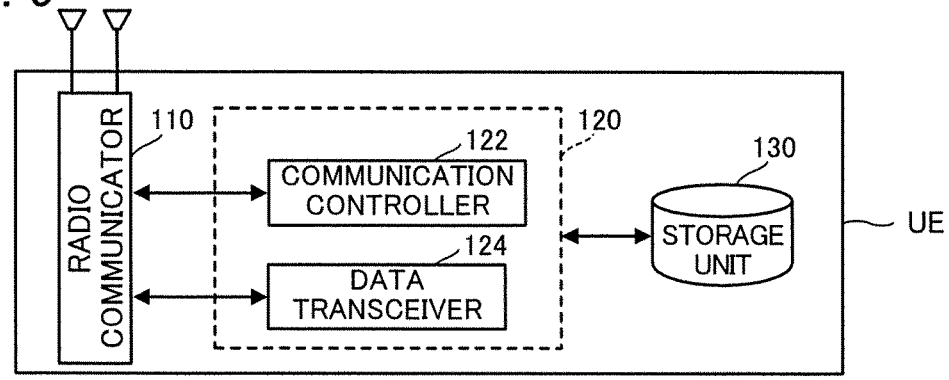
FIG. 9 is a block diagram showing the structure of a user equipment.

FIG. 9 is a block diagram showing the structure of the user equipment UE according to the first embodiment. The user equipment UE includes a radio communicator 110, a controller 120, and a storage unit 130. For the purpose of facilitating understanding, output devices for outputting sound, images, etc., and input devices for accepting user instructions, are omitted in FIG. 9. The radio communicator 110 is an element for executing wireless communication with the first base station eNB and the second base station PhNB, and includes transceiving antennas, a reception circuit for receiving radio signals (radio waves) and converting them to electrical signals, and a transmission circuit for converting electrical signals, such as control signals, user signals, to radio waves (radio waves), and sending them.

The controller 120 includes a communication controller 122 and a data transceiver 124. The communication controller 122 is an element for controlling communication between the user equipment UE and each base station (eNB and PhNB), and transmits and receives control signals (control messages) to and from the first base station eNB via the radio communicator 110. In other words, the communication controller 122 executes communication in the C-plane. For example, the communication controller 122 establishes the data radio bearer DRB on the basis of the received radio setting message, and then sends the radio setting completion message. The data transceiver 124 is an element for processing data signals, and transmits and receives user signals to and from each base station (eNB and PhNB) via the data radio bearers DRB (DRB1 and DRB2). In other words, the data transceiver 124 executes communication in the U-plane. The controller 120 and the above-mentioned elements in the controller 120 are functional blocks accomplished by the fact that a CPU (central processing unit, not shown) in the user equipment UE executes a computer program stored in the storage unit 130 and operates in accordance with the computer program. The storage unit 130 stores, in addition to the computer program, information on communication control, for example, the data radio bearer identifier DRBID of the base station (eNB or PhNB) to which the user equipment UE is connected wirelessly.

1(4)-2. Structure of First Base Station

Figure 10:
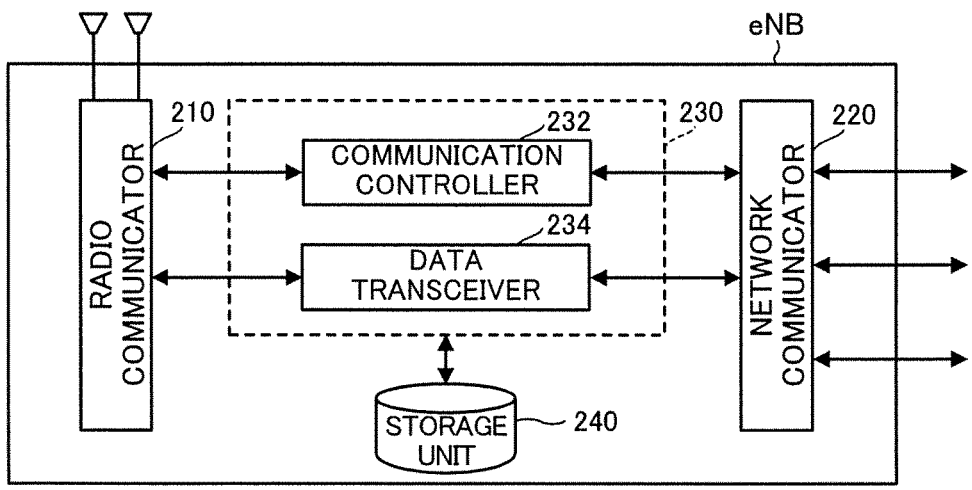
FIG. 10 is a block diagram showing the structure of a first base station.

FIG. 10 is a block diagram showing the structure of the first base station eNB according to the first embodiment. The first base station eNB includes a radio communicator 210, a network communicator 220, a controller 230, and a storage unit 240. The radio communicator 210 is an element for executing wireless communication with the user equipment UE, and has a structure similar to that of the radio communicator 110 of the user equipment UE. The network communicator 220 is an element for executing communication with other nodes within the network NW (the switching station MME, the first gateway SAEGW, etc.), and exchanges electrical signals with other nodes.

The controller 230 includes a communication controller 232 and a data transceiver 234. The communication controller 232 is an element for controlling radio resources for the user equipment UE on the basis of instructions (control messages) from upper nodes (such as the switching station MME), exchanges control signals with the switching station MME via the control bearer S1-MME, and exchanges control signals with the user equipment UE via the signaling radio bearer SRB. In other words, the communication controller 232 executes communication in the C-plane. For example, on the basis of the UE context setting request message received from the switching station MME, the communication controller 232 controls the user equipment UE to establish the data radio bearer DRB. Furthermore, if the first base station eNB and the second base station PhNB are interconnected, the communication controller 232 may exchange control signals with the second base station PhNB via the network communicator 220. The data transceiver 234 transmits and receives (relays) user signals to and from the user equipment UE via the first data radio bearer DRB1, and transmits and receives (relays) user signals to and from the first gateway SAEGW via the S1-U bearer S1B. In other words, the data transceiver 234 executes communication in the U-plane. The controller 230 and the above-mentioned elements in the controller 230 are functional blocks accomplished by the fact that a CPU (not shown) in the first base station eNB executes a computer program stored in the storage unit 240 and operates in accordance with the computer program. The storage unit 240 stores, in addition to the computer program, information on communication control, for example, identification information of the user equipment UE and the first gateway SAEGW to which the first base station eNB is connected.

1(4)-3. Structure of Second Base Station

Figure 11:
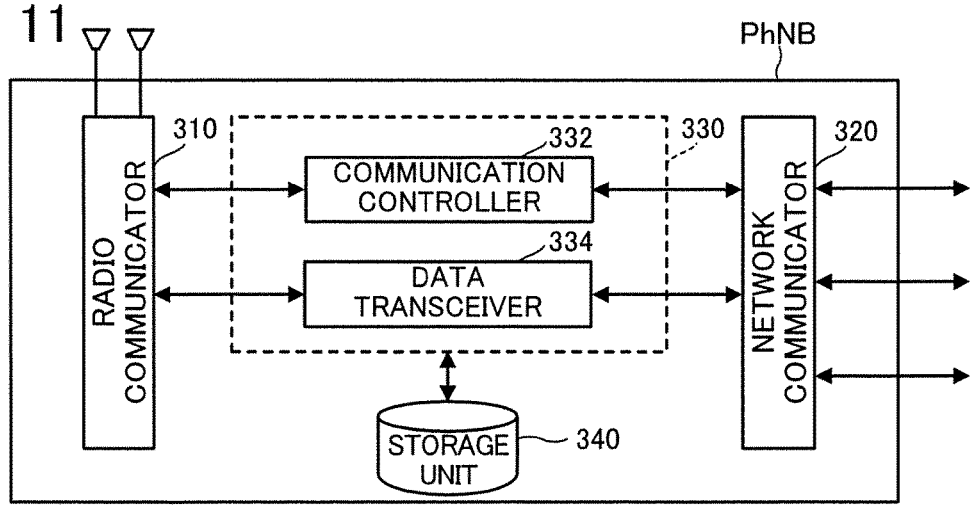
FIG. 11 is a block diagram showing the structure of a second base station.

FIG. 11 is a block diagram showing the structure of the second base station PhNB according to the first embodiment. The second base station PhNB includes a radio communicator 310, a network communicator 320, a controller 330, and a storage unit 340. The radio communicator 310 is an element for executing wireless communication with the user equipment UE, and has a structure similar to that of the radio communicator 210 of the first base station eNB. The network communicator 320 is an element for executing communication with other nodes within the network NW (the switching station MME, the second gateway PhGW, etc.), and has a structure similar to that of the network communicator 220 of the first base station eNB.

The controller 330 includes a communication controller 332 and a data transceiver 334. The communication controller 332 is an element for controlling communication with other nodes (for example, establishment of a U-plane path) on the basis of instructions (control messages) from upper nodes (such as the switching station MME) or decision at the communication controller 332 itself, and exchanges control signals with the switching station MME and the second gateway PhGW via the network communicator 320. In other words, the communication controller 332 executes communication in the C-plane. For example, the communication controller 332 establishes the uplink Ph bearer PhB-U on the basis of the bearer establishment request message received from the switching station MME, and transmits to the second gateway PhGW the local connection request message requesting establishment of the downlink Ph bearer PhB-D. However, the communication controller 332 does not transmit control signals to the user equipment UE (i.e., does not execute radio resource control for the user equipment UE). Furthermore, if the first base station eNB and the second base station PhNB are interconnected, the communication controller 332 may exchange control signals with the first base station eNB via the network communicator 320. The data transceiver 334 transmits and receives (relays) user signals to and from the user equipment UE via the second data radio bearer, and transmits and receives (relays) user signals to and from the second gateway PhGW via the Ph bearer PhB. In other words, the data transceiver 334 executes communication in the U-plane. The controller 330 and the above-mentioned elements in the controller 330 are functional blocks accomplished by the fact that a CPU (not shown) in the second base station PhNB executes a computer program stored in the storage unit 340 and operates in accordance with the computer program. The storage unit 340 stores, in addition to the computer program, information on communication control, for example, identification information of the user equipment UE and the second gateway PhGW to which the second base station PhNB is connected.

1(4)-4. Structure of Switching Station

Figure 12:
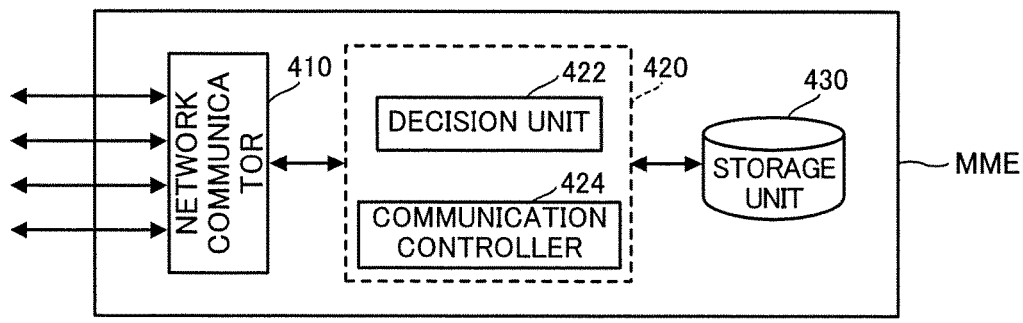
FIG. 12 is a block diagram showing the structure of a switching station.

FIG. 12 is a block diagram showing the structure of the switching station MME according to the first embodiment. The switching station MME includes a network communicator 410, a controller 420, and a storage unit 430. The network communicator 410 is an element for executing communication with other nodes within the network NW (the first base station eNB, the second base station PhNB, the first gateway SAEGW, the second gateway PhGW, etc.), and has a structure similar to that of the network communicator 220 of the first base station eNB.

The controller 420 includes a decision unit 422 and a communication controller 424. The decision unit 422 is an element for deciding a gateway GW with which the user equipment UE should execute communication, and for example, decides that the user equipment UE should execute communication through the second gateway PhGW at step S120 on the basis of the PDN connection request message. The communication controller 424 is an element for controlling establishment of logical paths between nodes (in particular, U-plane paths), and exchanges the above-mentioned control signals with the first base station eNB, the second base station PhNB, the first gateway SAEGW, the second gateway PhGW, etc. via the network communicator 410. In other words, the controller 420 executes communication in the C-plane to control establishment of logical paths between nodes. However, the switching station MME (controller 420) does not execute communication in the U-plane. The controller 420 is a functional block accomplished by the fact that a CPU (not shown) in the switching station MME executes a computer program stored in the storage unit 430 and operates in accordance with the computer program. The storage unit 430 stores, in addition to the computer program, information on communication control, for example, identification information of base stations (eNB and PhNB) and the gateways (SAEGW and PhGW) to which the switching station MME is connected.

1(4)-5. Structure of First Gateway

Figure 13:
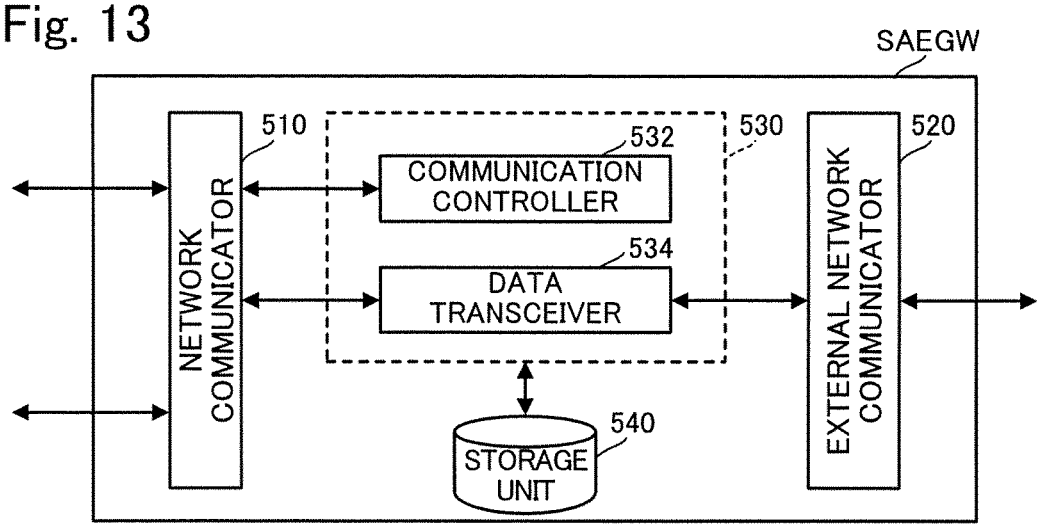
FIG. 13 is a block diagram showing the structure of a first gateway.

FIG. 13 is a block diagram showing the structure of the first gateway SAEGW according to the first embodiment. The first gateway SAEGW includes a network communicator 510, an external network communicator 520, a controller 530, and a storage unit 540. The network communicator 510 is an element for executing communication with other nodes within the network NW (the first base station eNB, the switching station MME, etc.), and has a structure similar to that of the network communicator 220 of the first base station eNB. The external network communicator 520 is an element for executing communication with the Internet IN, and performs protocol conversion of electrical signals (data signals) as needed.

The controller 530 includes a communication controller 532 and a data transceiver 534. The communication controller 532 is an element for executing communication control of the radio communication system CS, and exchanges control signals with the switching station MME and other nodes via the network communicator 510. The data transceiver 534 transmits (relays) data signals that are originated from the user equipment UE and that are received via the network communicator 510 to the Internet IN (external server in the internet IN) via the external network communicator 520, and transmits (relays) data signals received from the Internet IN (external server in the internet IN) via the external network communicator 520 to the user equipment UE via the network communicator 510. The controller 530 and the above-mentioned elements in the controller 530 are functional blocks accomplished by the fact that a CPU (not shown) in the first gateway SAEGW executes a computer program stored in the storage unit 540 and operates in accordance with the computer program. The storage unit 540 stores, in addition to the computer program, information on communication control, for example, identification information of the first base station eNB and the switching station MME to which the first gateway SAEGW is connected.

1(4)-6. Structure of Second Gateway

Figure 14:
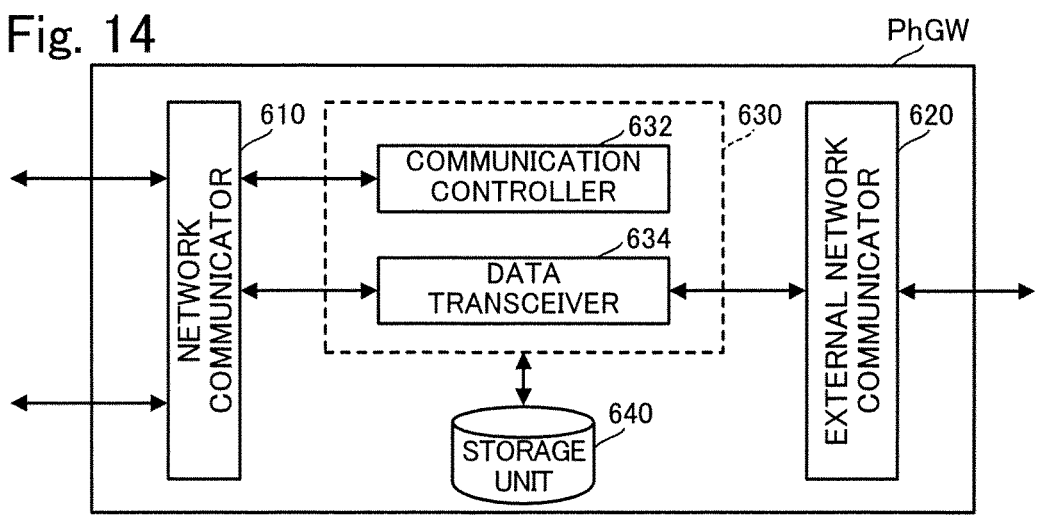
FIG. 14 is a block diagram showing the structure of a second gateway.

FIG. 14 is a block diagram showing the structure of the second gateway PhGW according to the first embodiment. The second gateway PhGW includes a network communicator 610, an external network communicator 620, a controller 630, and a storage unit 640. The network communicator 610 is an element for executing communication with other nodes within the network NW (the second base station PhNB, the switching station MME, etc.), and has a structure similar to that of the network communicator 220 of the first base station eNB. The external network communicator 620 is an element for executing communication with the Internet IN, and has a structure similar to that of the external network communicator 520 of the first gateway SAEGW.

The controller 630 includes a communication controller 632 and a data transceiver 634. The communication controller 632 is an element for controlling communication with other nodes (for example, establishment of a U-plane path) on the basis of instructions (control messages) from other nodes (the switching station MME, the second base station PhNB, etc.) or decision at the communication controller 632 itself, and exchanges control signals with the switching station MME and the second base station PhNB via the network communicator 610. In other words, the communication controller 632 executes communication in the C-plane. For example, the communication controller 632 generates the TEID of the uplink Ph bearer PhB-U on the basis of the session establishment request message received from the switching station MME, includes it in the session establishment response message, and sends it to the switching station MME. In addition, for example, the communication controller 632 establishes the downlink Ph bearer PhB-D on the basis of the local connection request message received from the second base station PhNB. The data transceiver 634 is an element similar to the data transceiver 534 of the first gateway SAEGW, and relays data signals exchanged between the user equipment UE and the Internet IN. The controller 630 and the above-mentioned elements in the controller 630 are functional blocks accomplished by the fact that a CPU (not shown) in the second gateway PhGW executes a computer program stored in the storage unit 640 and operates in accordance with the computer program. The storage unit 640 stores, in addition to the computer program, information on communication control, for example, identification information of the second base station PhNB and the switching station MME to which the second gateway PhGW is connected.

1(5). Effects of Present Embodiment

According to the above-described first embodiment, it is possible to provide a radio communication system CS including a new type of second base station PhNB, which is different from the first base station eNB, and a second gateway PhGW corresponding to the second base station PhNB. In this embodiment, in a case in which it is decided that the user equipment UE should execute communication through the second gateway PhGW, the second data radio bearer DRB2 and the Ph bearer PhB that are necessary for the communication are established, so that the communication through the second gateway PhGW can be executed.

The switching station MME makes a request to the user equipment UE via the first base station eNB for establishment of the second data radio bearer DRB2 to the second base station PhNB. Accordingly, in the above embodiment, although there is no C-plane path (signaling radio bearer SRB) between the second base station PhNB and the user equipment UE, a U-plane path (the second data radio bearer DRB2) to the second base station PhNB can be established.

2. Second Embodiment

A second embodiment of the present invention will be described. In the respective embodiments that will be exemplified below, symbols referred to in the above description will be used for identifying elements equivalent to those of the first embodiment in action or function, and description for such elements will be omitted as appropriate.

2(1). Establishment of U-plane Path Via First Base Station

Figure 15:
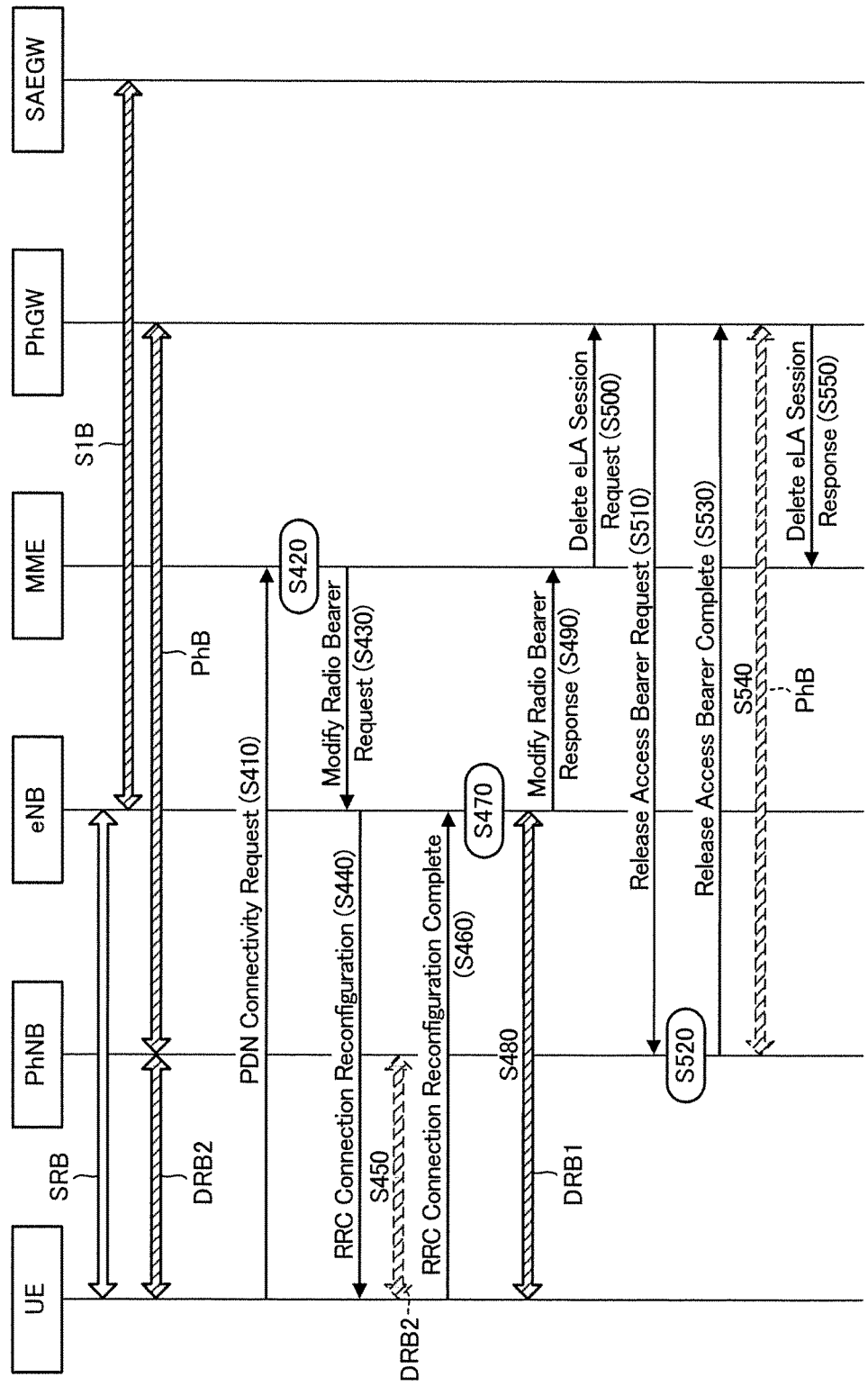
FIG. 15 is a flow diagram showing an example of an establishment operation of U-plane paths according to a second embodiment.

With reference to FIG. 15, an example of an establishment operation of a U-plane path via the first base station eNB will be described. In general, the user equipment UE has been executing communication with the Internet IN via the second base station PhNB and the second gateway PhGW. Thereafter, a U-plane path (first data radio bearer DRB1) is established via first base station eNB. The user equipment UE becomes capable of communicating with the Internet IN via the first base station eNB and the first gateway SAEGW with the use of the established U-plane path.

Figure 16:
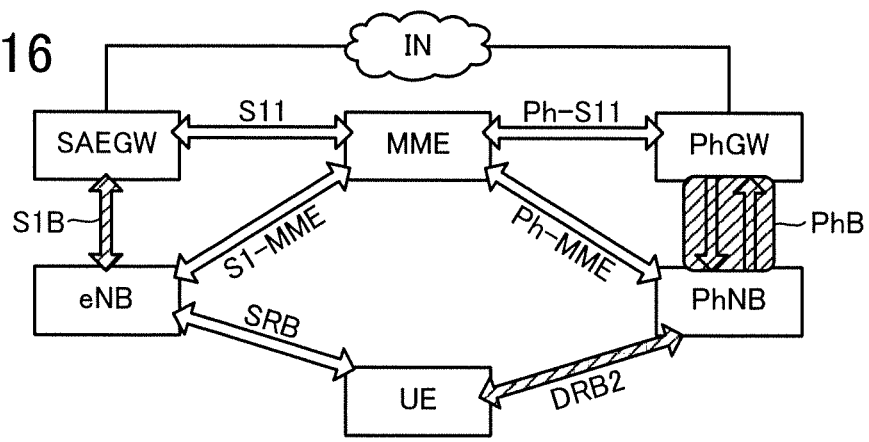
FIG. 16 is a diagram showing a state of logical paths within the radio communication system.

FIG. 16 is a diagram showing the state of logical paths at the start of operation in FIG. 15. As U-plane paths, the second data radio bearer DRB2 is established between the user equipment UE and the second base station PhNB, and the Ph bearer PhB is established between the second base station PhNB and the second gateway PhGW. In other words, a logical session (EPS bearer) involving the second data radio bearer DRB2 and the Ph bearer PhB is established between the user equipment UE and the second gateway PhGW. In addition, the S1-U bearer S1B is established between the first base station eNB and the first gateway SAEGW. At the start of operation in FIG. 15, the S1-U bearer S1B has not been used for communication for the user equipment UE. On the other hand, C-plane paths are established in the same manner as in the description of FIG. 3. As will be understood from the above, the state of logical paths at the start of operation in FIG. 15 (operation in the second embodiment) is the same as that at the end of operation in FIG. 2 (operation in the first embodiment) shown in FIG. 8.

2(1)-1. Release of Second Data Radio Bearer and Establishment of First Data Radio Bearer The user equipment UE sends a PDN connection request message (PDN Connectivity Request message) via the first base station eNB to the switching station MME (S410), the PDN connection request message requesting execution of communication through the first gateway SAEGW. In the same manner as in the first embodiment, the PDN connection request message includes the access point name of the gateway that is the connection point to the external network. Consequently, the PDN connection request message of this example includes the access point name identifying the first gateway SAEGW.

Upon receiving the PDN connection request message from the user equipment UE, on the basis of the access point name included in the PDN connection request message, the switching station MME (decision unit 422) decides that the gateway through which communication executed by the user equipment UE should be routed is the first gateway SAEGW. Then, the switching station MME (communication controller 424) decides that the second data radio bearer DRB2 established through the user equipment UE should be released and that the first data radio bearer DRB1 should be established between the user equipment UE and the first base station eNB (S420). After step S420, the switching station MME (communication controller 424) sends a radio bearer modification request message (Modify Radio Bearer Request message) and a PDN connection response message (PDN Connectivity Accept message) to the first base station eNB (S430), the radio bearer modification request message requesting release of the second data radio bearer DRB2.

Figure 17:
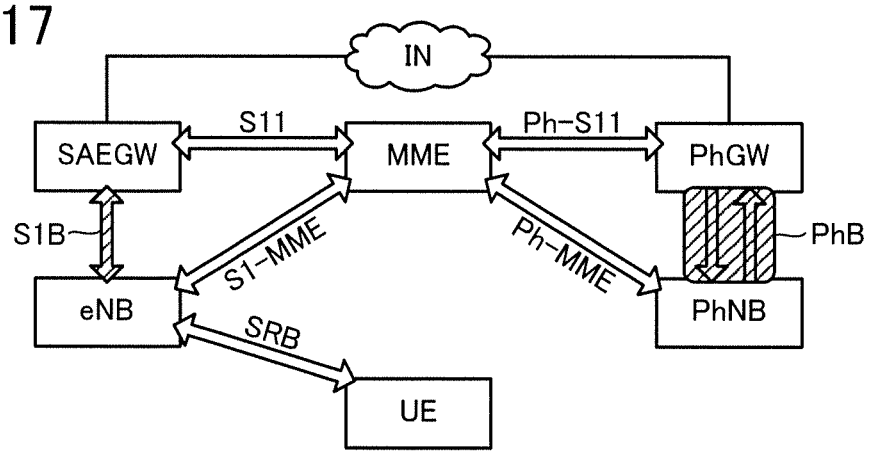
FIG. 17 is a diagram showing a state of logical paths within the radio communication system.

Upon receiving the radio bearer modification request message from the switching station MME, the first base station eNB (communication controller 232) sends a radio setting message (RRC Connection Reconfiguration message) requesting release of the second data radio bearer DRB2 to the user equipment UE (S440). Upon receiving the radio setting message from the first base station eNB, the user equipment UE (communication controller 122) releases the second data radio bearer DRB2 (S450). The state of logical paths after release of the second data radio bearer DRB2 is shown in FIG. 17.

Figure 18:
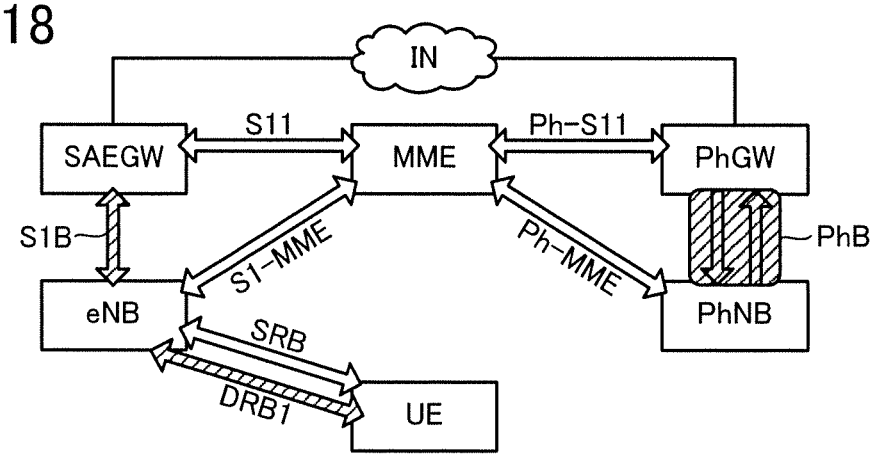
FIG. 18 is a diagram showing a state of logical paths within the radio communication system.

After step S450, the user equipment UE (communication controller 122) sends to the first base station eNB a radio setting completion message (RRC Connection Reconfiguration Complete message) that indicates that the second data radio bearer DRB2 has been released and that requests establishment of the first data radio bearer DRB1 (S460). Upon receiving the radio setting completion message from the user equipment UE, the first base station eNB (communication controller 232) establishes the first data radio bearer DRB1 between the user equipment UE and the first base station eNB. More specifically, the first base station eNB (communication controller 232) establishes the first data radio bearer DRB1 (S480) by associating the data radio bearer identifier DRBID corresponding to the first data radio bearer DRB1 with the S1-U bearer S1B (S470). The state of logical paths after establishment of the first data radio bearer DRB1 is shown in FIG. 18.

Upon establishment of the first data radio bearer DRB1, the first base station eNB (communication controller 232) sends a radio bearer modification response message (Modify Radio Bearer Response message) and a PDN connection completion message (PDN Connectivity Complete message) to the switching station MME (S490).

2(1)-2. Release of pH Bearer

Upon receiving the radio bearer modification response message, the switching station MME (communication controller 424) sends to the second gateway PhGW a session deletion request message (Delete eLA Session Request message) requesting release of the logical session (EPS bearer) involving the Ph bearer PhB (S500). Upon receiving the session deletion request message, the second gateway PhGW (communication controller 632) sends to the second base station PhNB an access bearer release request message (Release Access Bearer Request message) requesting release of the Ph bearer PhB (S510).

Figure 19:
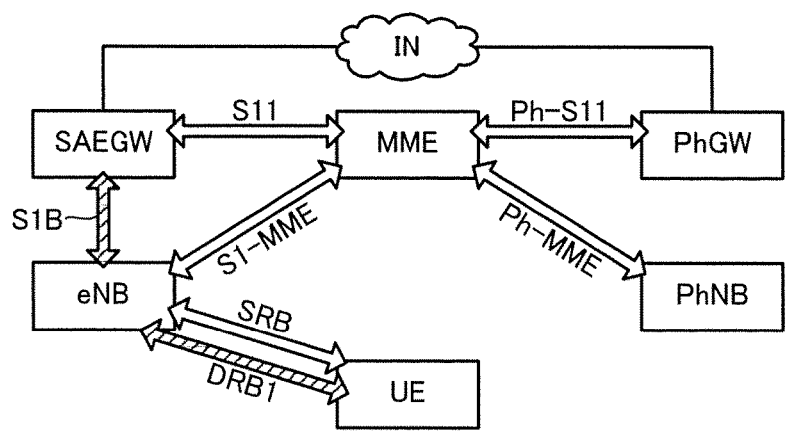
FIG. 19 is a diagram showing a state of logical paths within the radio communication system.

Upon receiving the access bearer release request message, the second base station PhNB (communication controller 332) dissolves the association between the Ph bearer PhB and the second data radio bearer DRB2 (S520), and sends an access bearer release completion message (Release Access Bearer Complete message) to the second gateway PhGW (S530). Upon receiving the access bearer release completion message, the second gateway PhGW (communication controller 632) releases the Ph bearer PhB, and releases the logical session (EPS bearer) (S540). The state of logical paths after release of the Ph bearer PhB is shown in FIG. 19.

After completion of step S540, the second gateway PhGW (communication controller 632) sends to the switching station MME a session deletion response message (Delete eLA Session Response message) indicating that the Ph bearer PhB and the logical session have been released (S550).

2(2). Effects of Present Embodiment

According to the above-described second embodiment, it is possible to provide a radio communication system CS including a new type of second base station PhNB, which is different from the first base station eNB, and a second gateway PhGW corresponding to the second base station PhNB. In this embodiment, in a case in which it is decided that the user equipment UE should execute communication through the first gateway SAEGW, the first data radio bearer DRB1 that is necessary for the communication is established, so that the communication through the first gateway SAEGW can be executed.

3. Modifications

Various modifications may be applied to the above-described embodiments. Specific modifications are exemplified below. Two or more selected from among the above-described embodiments and exemplifications stated below may be combined as long as there is no conflict.

3(1). Modification 1

In the above-described embodiments, the first gateway SAEGW is an SAE Gateway stipulated in the 3GPP standards. As stipulated in the 3GPP standards, an SAE Gateway is an element involving functions of a Serving Gateway and functions of a Packet-Data-Network Gateway, and the Serving Gateway and the Packet-Data-Network Gateway may be provided separately. Accordingly, in the above-described embodiments, the first gateway SAEGW may be constituted of multiple apparatuses, for example, a single Serving Gateway and a single Packet-Data-Network Gateway.

3(2). Modification 2

In the first embodiment, a single Ph bearer PhB is established. The bearer establishment is used for newly establishing a Ph bearer PhB, and is also used for establishment of a new Ph bearer PhB in a case in which one or more Ph bearers PhB have been established. The first embodiment assumes that the first data radio bearer DRB1 has been established, but the establishment of a data radio bearer according to the first embodiment may be used even in a case in which no data radio bearer DRB has been established.

3(3). Modification 3

In the first embodiment, the user equipment UE transmits the PDN connection request message to the switching station MME, whereby establishment of U-plane paths through the second base station PhNB and the second gateway PhGW is started. In the embodiment, the transmission of the PDN connection request message may be triggered by a freely decided event. For example, the first base station eNB to which the user equipment UE is being connected may transmit to the user equipment UE an instruction (RRC Connection Reconfiguration message) for handover to the second base station PhNB, on the basis of a measurement report message received from the user equipment UE. The user equipment UE may be triggered by the handover instruction to transmit the PDN connection request message including the access point name identifying the second gateway PhGW to the switching station MME. Alternatively, a node other than the user equipment UE may trigger establishment of the U-plane paths of the first embodiment. For example, the switching station MME may be triggered by congestion of the first gateway SAEGW to start establishment of the U-plane paths of the first embodiment. In other words, the trigger of establishment of the U-plane paths of the first embodiment may be freely decided. The same is true for the start of establishment of the U-plane path of the second embodiment.

3(4). Modification 4

In the first embodiment, the procedure for establishment of the downlink Ph bearer PhB-D (step S250 and subsequent steps) may be started after receiving the bearer establishment request message (step S160), rather than after establishment of the second data radio bearer DRB2. In this case, the procedure from step S170 to step S240 can be executed in parallel to the procedure from step S250 to step S290. Accordingly, the establishment of the U-plane paths of the first embodiment can be accomplished more quickly.

3(5). Modification 5

In the above-described embodiments, control messages having various names (for example, the bearer establishment request message, the access bearer release completion message, etc.) are used. However, it will be appreciated, of course, that the name of each control messages is not so limited. Each control message is intended to cover any control signal having an equivalent function.

3(6). Modification 6

Figure 20:
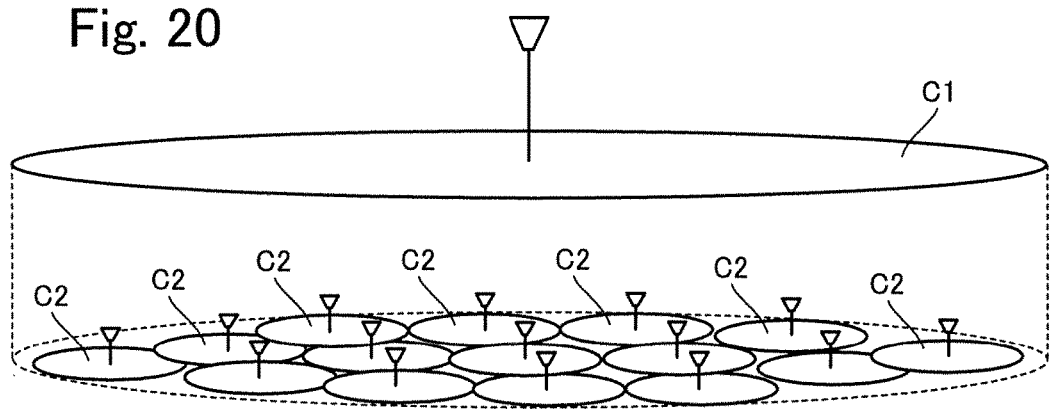
FIG. 20 is an explanatory diagram showing an example of a formation of cells formed by base stations.

In the above-described embodiments, the size of a cell C formed by and around each base station eNB or PhNB (range in which radio waves effectively reach) is not limited. For example, the first base station eNB may have higher radio transmission capabilities (average transmission power, maximum transmission power, etc.) in comparison with those of the second base station PhNB, so that the cell formed by the first base station eNB (macrocell C1) may be larger than the cell formed by the second base station PhNB (small cell C2). In this construction, it is preferable that small cells C2 be formed in a multilayered way (i.e., overlaid) inside the macrocell C1, for example, as shown in FIG. 20. As a matter of convenience of illustration, the plane in which the macrocell C1 lies is different from the plane in which the small cells C2 lie, but in fact, the macrocell C1 and the small cells C2 can be overlaid in the same plane (such as on a geosphere). Moreover, the first base station eNB and the second base station PhNB may form cells C having substantially the same size.

3(7). Modification 7

The frequency band of radio waves sent by the first base station eNB may be different from the frequency band of radio waves sent by the second base station PhNB. For example, let us assume that the first base station eNB uses a first frequency band (for example, 2 GHz band) for wireless communication, and the second base station PhNB uses a second frequency band (for example, 3.5 GHz band) higher than the first frequency band. Since the higher the frequency, the higher the propagation loss, wireless communication using the first frequency band is more stable than wireless communication using the second frequency band. As described concerning the above-described embodiments, the first base station eNB executes transmission and reception of control signals, i.e., control messages (C-plane communication) to and from the user equipment UE. Accordingly, if Modification 8 is adopted, transmission and reception of control signals (C-plane communication) is executed at the first frequency band with higher stability, which results in more reliable control of the user equipment UE.

3(8). Modification 8

In the above-described embodiments, the first base station eNB is an evolved Node B stipulated in the 3GPP standards. However, the first base station eNB may be any other type of radio base station. For example, the first base station eNB may be a base station that forms the above-mentioned small cell C2.

3(9). Modification 9

In the above-described embodiments, the second base station PhNB does not exchange control signals with the user equipment UE. However, the second base station PhNB may exchange control signals of lower layers (for example, the L1 layer and the L2 layer) with the user equipment UE. Even in this modification, the second base station PhNB does not exchange signals for radio resource control (control signals of the RRC layer) with the user equipment UE.

3(10). Modification 10

The user equipment UE may be of any type of device that can perform radio communication with the first base station eNB and the second base station PhNB. The user equipment UE may be a cell phone terminal, e.g., a feature phone or a smart phone, a desk-top type personal computer, a laptop personal computer, a UMPC (ultra-mobile personal computer), a portable game machine, or other type of radio terminal.

3(11). Modification 11

In each of the elements in the radio communication system CS (the user equipment UE, the first base station eNB, the second base station PhNB, the switching station MME, the first gateway SAEGW, and the second gateway PhGW), functions executed by the CPU may be executed by hardware or a programmable logic device, such as an FPGA (Field Programmable Gate Array) or a DSP (Digital Signal Processor), instead of the CPU.

REFERENCE SYMBOLS

| | |
|---|---|
| UE: User Equipment | 110: Radio Communicator |
| 120: Controller | 122: Communication Controller |
| 124: Data Transceiver | 130: Storage Unit |
| eNB: First Base Station | 210: Radio Communicator |
| 220: Network Communicator | 230: Controller |
| 232: Communication Controller | 234: Data Transceiver |
| 240: Storage Unit | PhNB: Second Base Station |
| 310: Radio Communicator | 320: Network Communicator |
| 330: Controller | 332: Communication Controller |
| 334: Data Transceiver | 340: Storage Unit |
| MME: Switching Station | 410: Network Communicator |
| 420: Controller | 422: Decision Unit |
| 424: Communication Controller | 430: Storage Unit |
| SAEGW: First Gateway | 510: Network Communicator |
| 520: External Network Communicator | |
| 530: Controller | 532: Communication Controller |
| 534: Data Transceiver | 540: Storage Unit |
| PhGW: Second Gateway | 610: Network Communicator |
| 620: External Network Communicator | |
| 630: Controller | 632: Communication Controller |
| 634: Data Transceiver | 640: Storage Unit |
| C: Cell | C1: Macrocell |
| C2: Small Cell | CS: Radio Communication System |
| DRB (DRB1, DRB2): Data Radio Bearer | |
| DRBID: Data Radio Bearer Identifier | |
| GW: Gateway | IN: Internet |
| NW: Network | |
| Ph-MME, Ph-S11, S1-MME, | |
| S11: Control Bearer | |
| PhB: Ph Bearer | PhB-D: Downlink Ph Bearer |
| PhB-U: Uplink Ph Bearer | S1B: S1-U Bearer |
| SRB: Signaling Radio Bearer | |

The invention claimed is:

1. A radio communication system comprising:
at least one user equipment;
multiple base stations comprising a first base station that executes radio resource control of the user equipment through a control path, and a second base station that does not execute radio resource control of the user equipment;
multiple gateways comprising a first gateway connected with the first base station, and a second gateway connected with the second base station; and
a switching station that controls establishment of user paths among nodes,
the switching station comprising:
a switching station controller that decides whether or not a gateway through which communication executed by the user equipment should be routed is the first gateway,
wherein the switching station controller further, in a case in which the user equipment has executed communication via a logical session involving a first user path established between the second gateway and the second base station and a second user path established between the second base station and the user equipment, and in a case in which the switching station controller decides that the gateway through which communication executed by the user equipment should be routed is the first gateway, controls the first base station so as to release the second user path and so as to establish a third user path between the user equipment and the first base station,
the first base station comprising:
a first base station controller that controls the user equipment so as to establish the third user path on the basis of control by the switching station controller,
wherein the switching station controller controls the second gateway and the second base station so as to release the first user path after establishment of the third user path,
wherein the switching station controller transmits a second user path modification request message to the first base station in a case in which the switching station controller decides that the gateway through which communication executed by the user equipment should be routed is the second gateway, the second user path modification request message requesting release of the second user path,
wherein the first base station controller transmits a radio setting message to the user equipment upon receiving the second user path modification request message, the radio setting message requesting release of the second user path,
wherein the user equipment comprises a user equipment controller that, upon receiving the radio setting message, releases the second user path and transmits a radio setting completion message to the first base station, the radio setting completion message indicating that the second user path has been released and requesting establishment of the third user path, and
wherein the first base station controller establishes the third user path between the first base station and the user equipment, and transmits to the switching station a second user path modification response message indicating that the third user path has been established.

2. The radio communication system according to claim 1, wherein
the switching station controller transmits to the second gateway a session deletion request message requesting release of the logical session involving the first user path upon receiving the second user path modification response message,
wherein the second gateway comprises a second gateway controller that transmits to the second base station a first user path release request message requesting release of the first user path upon receiving the session deletion request message,
wherein the second base station comprises a second base station controller that, upon receiving the first user path release request message, dissolves association between the first user path and the second user path, and transmits a first user path release response message to the second gateway, and
wherein the second gateway controller releases the first user path upon receiving the first user path release response message.

3. A control method in a radio communication system comprising:
at least one user equipment;
multiple base stations comprising a first base station that executes radio resource control of the user equipment through a control path, and a second base station that does not execute radio resource control of the user equipment;

multiple gateways comprising a first gateway connected with the first base station, and a second gateway connected with the second base station; and a switching station that controls establishment of user paths among nodes, the method comprising:

at the switching station, deciding whether or not a gateway through which communication executed by the user equipment should be routed is the second gateway;

controlling the first base station so as to release a second user path and so as to establish a third user path between the user equipment and the first base station in a case in which the user equipment has executed communication via a logical session involving a first user path established between the second gateway and the second base station and the second user path established between the second base station and the user equipment, and in a case in which it is decided that the gateway through which communication executed by the user equipment should be routed is the second gateway, at the first base station, controlling the user equipment so as to establish the third user path on the basis of control by the switching station, and at the switching station, controlling the second gateway and the second base station so as to release the first user path after establishment of the third user path, and transmitting a second user path modification request message to the first base station in a case in which the switching station controller decides that the gateway through which communication executed by the user equipment should be routed is the second gateway, the second user path modification request message requesting release of the second user path, at the first base station, transmitting a radio setting message to the user equipment upon receiving the second user path modification request message, the radio setting message requesting release of the second user path, at the user equipment, upon receiving the radio setting message, releasing the second user path and transmitting a radio setting completion message to the first base station, the radio setting completion message indicating that the second user path has been released and requesting establishment of the third user path, and at the first base station, establishing the third user path between the first base station and the user equipment, and transmitting to the switching station a second user path modification response message indicating that the third user path has been established.

* * * * *